(12) United States Patent
Wu et al.

(10) Patent No.: US 10,429,977 B2
(45) Date of Patent: Oct. 1, 2019

(54) ARRAY SUBSTRATE, DISPLAY PANEL, DISPLAY DEVICE AND METHOD FOR DRIVING ARRAY SUBSTRATE

(71) Applicant: Xiamen Tianma Micro-Electronics Co., Ltd., Xiamen (CN)

(72) Inventors: Huangyao Wu, Xiamen (CN); Huanda Wu, Xiamen (CN); Lei Zhang, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/798,884

(22) Filed: Oct. 31, 2017

(65) Prior Publication Data

US 2018/0341356 A1 Nov. 29, 2018

(30) Foreign Application Priority Data

May 24, 2017 (CN) .......................... 2017 1 0372779

(51) Int. Cl.
*G06F 3/041* (2006.01)
*G06F 3/044* (2006.01)
(Continued)

(52) U.S. Cl.
CPC ...... *G06F 3/0412* (2013.01); *G02F 1/133514* (2013.01); *G02F 1/133711* (2013.01); *G06F 3/044* (2013.01); *G06F 3/0416* (2013.01)

(58) Field of Classification Search
CPC ....... G06F 3/0412; G06F 3/044; G06F 3/0416
See application file for complete search history.

(56) References Cited

U.S. PATENT DOCUMENTS

2011/0267293 A1* 11/2011 Noguchi ............... G06F 3/0416
345/173
2015/0355510 A1* 12/2015 Kurasawa ............. G06F 3/0412
349/12

(Continued)

FOREIGN PATENT DOCUMENTS

| CN | 102236464 A | 11/2011 |
| CN | 204719368 U | 10/2015 |
| CN | 106681044 A | 5/2017 |

OTHER PUBLICATIONS

CN Office Action dated Apr. 29, 2019 for corresponding CN Application No. 201710372779.3.

*Primary Examiner* — Xuemei Zheng
(74) *Attorney, Agent, or Firm* — Tarolli, Sundheim, Covell & Tummino LLP

(57) ABSTRACT

The present disclosure relates to an array substrate, a display panel, a display device and a method for driving the array substrate, which avoid the common electrode block from providing pulse signals of a same polarity for a long time, thereby reducing probability of polarization of the liquid crystal and improving display performance. The array substrate, includes a common electrode layer, the common electrode layer including at least one common electrode block, at least one touch signal line, and a driving signal module; the common electrode layer including at least one common electrode block; wherein each touch signal line is connected with a corresponding common electrode block and the driving signal module, and the driving signal module outputs at least two types of touch driving signals with opposite polarities to at least one of the at least one common electrode block at each touch stage.

15 Claims, 7 Drawing Sheets

(51) Int. Cl.
*G02F 1/1333* (2006.01)
*G02F 1/1343* (2006.01)
*G02F 1/1337* (2006.01)
*G02F 1/1335* (2006.01)

(56) References Cited

U.S. PATENT DOCUMENTS

2016/0253023 A1* 9/2016 Aoyama ............... G06F 3/0416
　　　　　　　　　　　　　　　　　　　　345/174
2018/0261628 A1* 9/2018 Imai .................... H01L 27/124

* cited by examiner outputting, by a driving signal module, at least two types of touch driving signal with opposite polarities to at least one common electrode block at each touch stage t1 acquiring at least one sensing signal on the at least one common electrode block, and determining a touch position according to the at least one sensing signal

ARRAY SUBSTRATE, DISPLAY PANEL, DISPLAY DEVICE AND METHOD FOR DRIVING ARRAY SUBSTRATE

CROSS-REFERENCE TO RELATED APPLICATIONS

The present application claims priority to Chinese Patent Application No. 201710372779.3, filed on May 24, 2017, the content of which is incorporated herein by reference in its entirety.

TECHNICAL FIELD

The present disclosure relates to the field of liquid crystal display techniques and, particularly, relates to an array substrate, a display panel, a display device and a method for driving the array substrate.

BACKGROUND

Generally, a liquid crystal product of the art can have the touch function which is realized by common electrode blocks distributed in a matrix. At a display stage, a common electrode voltage is output to all the common electrode blocks, while at a touch stage, a pulse signal, as a touch driving signal, is output to all the common electrode blocks, so that the common electrode block is also used as a touch electrode, and the touch position is determined by detecting sensing signals on all the common electrode blocks at the same time.

However, at the touch stage, the common electrode blocks generate respective electric fields when receiving pulse signals of a same polarity. If a liquid crystal is subjected to the influence of the pulse signals of the common electrode blocks for a long time, the crystal liquid will be readily polarized, thereby causing poor display.

SUMMARY

The embodiment of the present disclosure provides an array substrate, a display panel, a display device and a method for driving the array substrate, which can avoid the common electrode block from providing pulse signals of a same polarity for a long time, thereby reducing the possibility of polarization of the liquid crystal and thus improving the poor display performance resulted therefrom.

The present disclosure provides an array substrate, including a common electrode layer, the common electrode layer including at least one common electrode block; at least one touch signal line; and a driving signal module; wherein each of the at least one touch signal line is connected with a corresponding common electrode block of the at least one common electrode block, each of the at least one touch signal line is connected with the driving signal module, and the driving signal module is configured to output at least two types of touch driving signals with opposite polarities to at least one of the at least one common electrode block at each touch stage.

The present disclosure further provides a display panel, including an array substrate, the array substrate including a common electrode layer, at least one touch signal line and a driving signal module, the common electrode layer including at least one common electrode block, a first alignment film, a second alignment film, a liquid crystal layer, and a color film substrate; wherein each of the at least one touch signal line is connected with a corresponding common electrode block of the at least one common electrode block, each of the at least one touch signal line is connected with the driving signal module, and the driving signal module is configured to output at least two types of touch driving signals with opposite polarities to at least one of the at least one common electrode block at each touch stage, and wherein the array substrate is parallel to the color film substrate; and the first alignment film, the liquid crystal layer and the second alignment film are successively arranged between the array substrate and the color film substrate.

The present disclosure further provides a display panel, including an array substrate, the array substrate including a common electrode layer, at least one touch signal line, a driving signal module, a first alignment film and a conductive layer, the common electrode layer including at least one common electrode block, a first alignment film, a conductive layer, a second alignment film, a liquid crystal layer, and a color film substrate; wherein each of the at least one touch signal line is connected with a corresponding common electrode block of the at least one common electrode block, each of the at least one touch signal line is connected with the driving signal module, and the driving signal module is configured to output at least two types of touch driving signals with opposite polarities to at least one of the at least one common electrode block at each touch stage; wherein the conductive layer contacts the first alignment film, and the driving signal module is configured to output at least two types of touch driving signals with opposite polarities to the conductive layer at each touch stage; and wherein the array substrate is parallel to the color film substrate; and the liquid crystal layer and the second alignment film are successively arranged between the array substrate and the color film substrate.

The present disclosure further provides a method for driving an array substrate, including a step of outputting, by a driving signal module, at least two types of touch driving signals with opposite polarities to at least one common electrode block at each touch stage.

By the array substrate, the display panel, the display device and the method for driving the array substrate, at least two types of touch driving signals with opposite polarities are output to the common electrode block at each touch stage, which avoids the common electrode block from providing pulse signals of a same polarity for a long time, that is, the liquid crystal will not be subjected to pulse voltage signals of a same polarity for a long time, thereby reducing the probability of the polarization of the liquid crystal and improving the poor display resulted therefrom.

BRIEF DESCRIPTION OF DRAWINGS

In order to more clearly illustrate technical solutions in embodiments of the present disclosure, the accompanying drawings necessary for the embodiments are briefly introduced as follows. Obviously, the drawings described as follows are merely a part of the embodiment of the present disclosure, based on these drawings, other drawings can also be acquired by those skilled in the art without paying creative efforts.

DESCRIPTION OF EMBODIMENTS

In order to better understand the technical solutions of the present disclosure, embodiments of the present disclosure are described in detail as follows with reference to the accompanying drawings. It should be noted that, the described embodiments are merely a part of the embodiment of the present disclosure but not all the embodiments. Based on the embodiments in the present disclosure, all other embodiments obtained by those skilled in the art without any creative efforts shall fall into the protection scope of the present disclosure.

The terms used in the embodiment of the present disclosure are merely intended to describe specific embodiments but not to limit the present disclosure. An expression of "a", "an", "the" or "such" in a singular form used in the embodiments and claims of the present disclosure is also intended to include the plural form thereof, unless otherwise noted.

Figure 1:
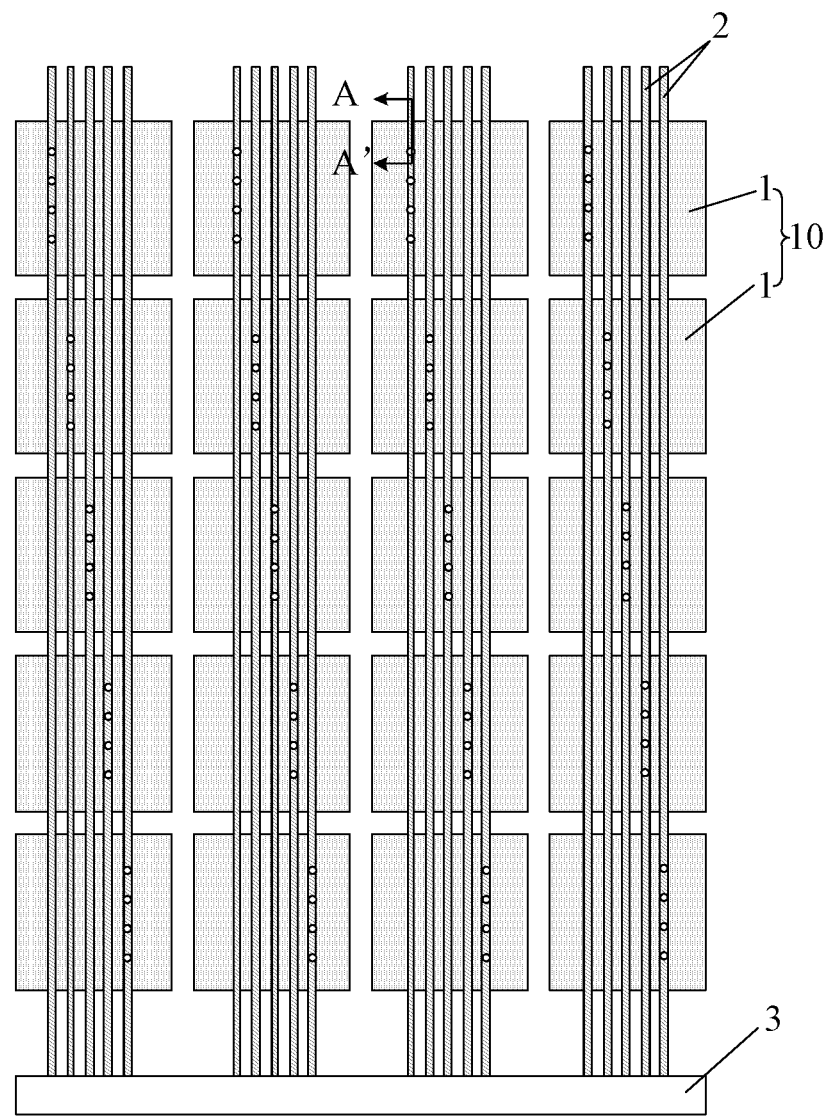
FIG. 1 illustrates a structural schematic diagram of an array substrate according to an embodiment of the present disclosure.
Figure 2:
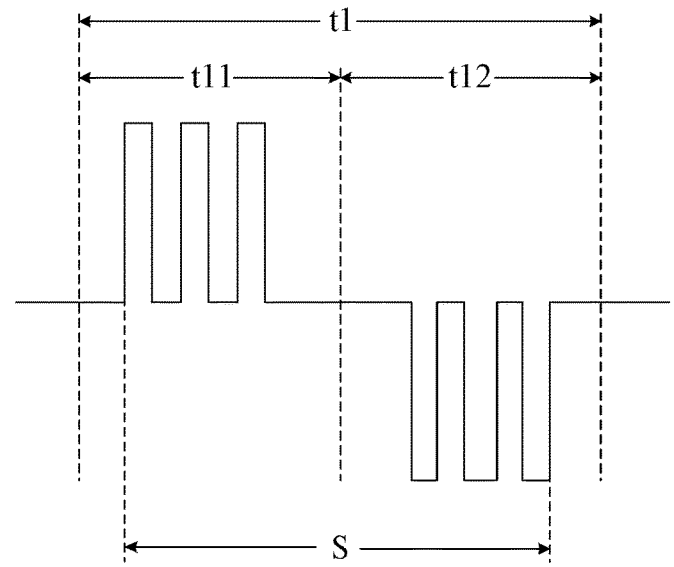
FIG. 2 illustrates a timing sequence diagram of signals output by a driving signal module to a common electrode block at one touch stage according to an embodiment of the present disclosure.
Figure 3:
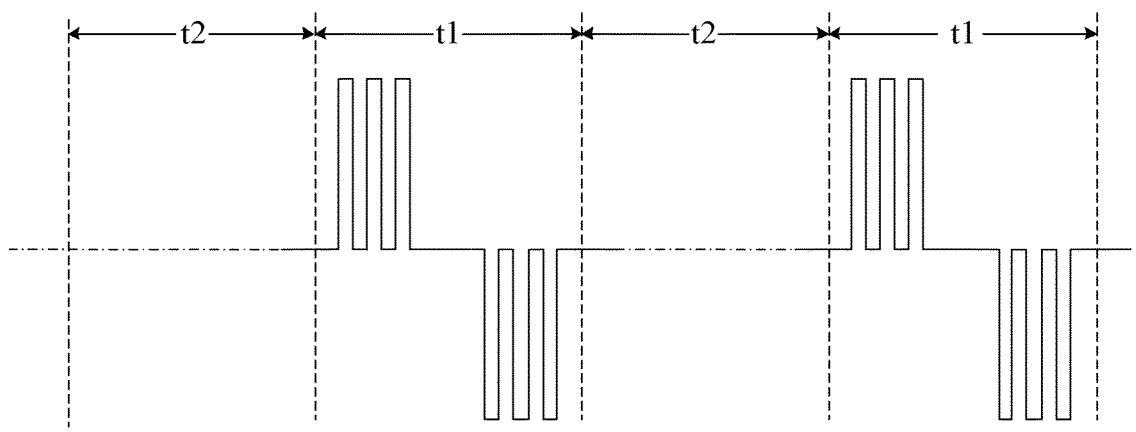
FIG. 3 illustrates a timing sequence diagram of signals output by a driving signal module to a common electrode block at multiple touch stages and multiple display stages according to an embodiment of the present disclosure.

As shown in FIG. 1, the present disclosure provides an array substrate, and the array substrate includes a common electrode layer 10, a pixel electrode (not shown in FIG. 1), at least one touch signal line 2, and a driving signal module 3. The common electrode layer 10 includes at least one common electrode block 1. Each of the at least one touch signal line 2 is connected with its corresponding common electrode block(s) 1 and the driving signal module 3. As shown in FIG. 2 and FIG. 3, the driving signal module 3 outputs at least two types of touch driving signals with opposite polarities to the at least one common electrode block 1 at each touch stage t1.

As shown in FIG. 3, during working, the array substrate has a plurality of touch stages t1 and a plurality of display stages t2, and one touch stage t1 alternates with one display stage t2. At each display stage t2, the driving signal module 3 outputs a common electrode voltage to the at least one common electrode block 1, and an electric field is generated between the at least one common electrode block 1 and the pixel electrode to drive a liquid crystal in a liquid crystal layer to deflect, thereby achieving the display function. As shown in FIG. 1, FIG. 2 and FIG. 3, at each touch stage t1, the driving signal module 3 outputs at least two types of touch driving signals with opposite polarities to the at least one common electrode block 1 and, at the same time, detects a sensing signal on each common electrode block 1 to realize the touch function. Thus, at each touch stage t1, each common electrode block 1 has both a pulse voltage signal with positive polarity and a pulse voltage signal with negative polarity, so that the liquid crystal will not be subjected to pulse voltage signals of the same polarity for a long time, thereby reducing the possibility of polarization of the liquid crystal. In addition, at each touch stage t1, the at least two types of touch driving signals with opposite polarities output by the driving signal module 3 to each common electrode block 1 can be symmetrical pulse signals, that is, the number, the width and the amplitude value of the two pulse signals with opposite polarities output to one common electrode block 1 are identical. It should be noted that, FIG. 3 merely illustrates a waveform of pulses at each touch stage t1, and the waveform of pulses at each display stage t2 is not shown.

According to an embodiment, at each touch stage, the array substrate outputs at least two types of touch driving signals with opposite polarities to the common electrode block, which avoids the common electrode block from providing pulse signals of a same polarity for a long time, that is, the liquid crystal is not subjected to pulse voltage signals of a same polarity for a long time, thereby reducing the possibility of polarization of the liquid crystal and thus improving the poor display resulted therefrom.

Optionally, as shown in FIG. 1 and FIG. 2, at each touch stage t1, the driving signal module 3 outputs at least two types of touch driving signals with opposite polarities to all of the at least one common electrode block 1, thereby reducing the possibility of polarization of the liquid crystals corresponding to all of the at least one common electrode block 1 and thus improving the poor display resulted therefrom.

Optionally, as shown in FIG. 1, the common electrode layer 10 includes a plurality of common electrode blocks 1 distributed in a matrix. At the touch stage, a touch position is determined by detecting a sensing signal on each common electrode block 1, i.e., the plurality of common electrode blocks 1 distributed in a matrix can determine the touch position by their own positions.

Optionally, as shown in FIG. 1, each common electrode block 1 is connected with least one touch signal line 2 configured to output a touch driving signal to each common electrode block 1 at the touch stage and, in the meantime, transmit the sensing signal on each common electrode block 1 to the driving signal module 3. According to the sensing signal on each common electrode block 1, the driving signal module 3 determines whether there is a touch or not and determines the touch position. By simultaneously outputting identical touch signals to the plurality of common electrode blocks 1 distributed in a matrix, i.e., in a manner that the touch function is realized by a self-capacitance touch electrode, time for the touch stage is significantly saved, thereby improving display refresh frequency, as compared with a mutual-capacitance touch electrode.

Optionally, as shown in FIG. 1 and FIG. 3, the waveform of touch driving signals output by the driving signal module 3 at one touch stage t1 is identical to the waveform of touch driving signals output by the driving signal module 3 at any other touch stage t1, so that the influences of the touch driving signals at all touch stages on the liquid crystal tend to be identical, thereby improving display uniformity.

Figure 4:
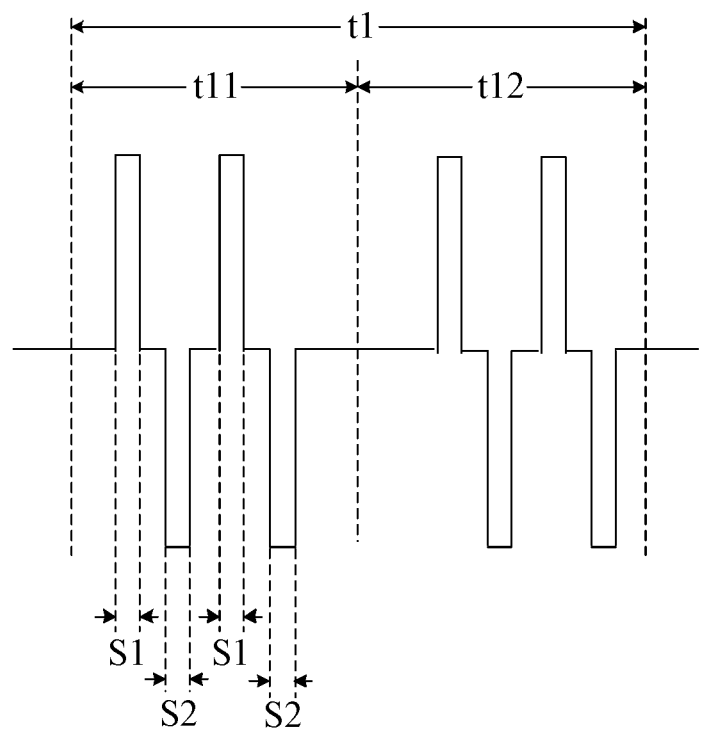
FIG. 4 illustrates a timing sequence diagram of signals output by another driving signal module to a common electrode block at one touch stage according to an embodiment of the present disclosure.

Optionally, as shown in FIG. 4, the above waveform includes at least one group of touch driving signals, each group of touch driving signals includes a touch driving signal S1 with positive polarity and a touch driving signal S2 with negative polarity. Herein, the touch driving signal S1 with positive polarity refers to a positive pulse, and the touch driving signal S2 with negative polarity refers to a negative pulse. A plurality of groups of touch driving signals emerges alternatively, so that the crystal can be subjected to voltages with opposite polarities in a short time, thereby further reducing the possibility of polarization of the crystal and improving the poor display resulted therefrom.

Optionally, as shown in FIG. 2, the waveform includes at least one group of touch driving signals S (FIG. 2 merely illustrates a situation in which the waveform of touch driving signals at each touch stage t1 merely includes one group of touch driving signals S). Each group of touch driving signals S includes a touch driving signal with positive polarity and a touch driving signal with negative polarity, and the number of the touch driving signal with positive polarity is equal to the number of the touch driving signal with negative polarity. Herein, the number of the touch driving signal with positive polarity refers to the number of positive pulse, and the number of the touch driving signal with negative polarity refers to the number of negative pulse. Since the number of the positive pulse is equal to the number of the negative pulse at touch stage t1, the influence of pulse signals with positive polarity on the liquid crystal can better offset the influence of pulse signals with negative polarity on the liquid crystal at one touch stage t1, thereby further reducing the possibility of polarization of the crystal and improving the poor display resulted therefrom.

Figure 5:
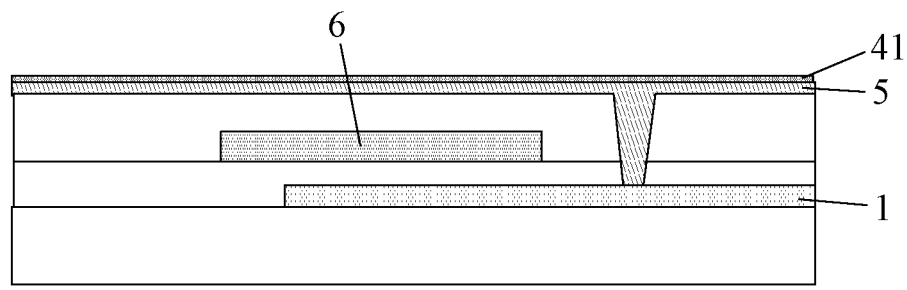
FIG. 5 illustrates a structural schematic diagram of a cross-section along AA' direction in FIG. 1.

Optionally, as shown in FIG. 5, the array substrate further includes: a first alignment film 41 and a conductive layer 5. The conductive layer 5 contacts with the first alignment film 41. The driving signal module outputs at least two types of touch driving signals with opposite polarities to the conductive layer 5 at each touch stage. The conductive layer 5 may be any membranous layer structure directly contacting with the first alignment film 41. Further, the conductive layer 5 includes a member necessary to be provided with the touch driving signal, for example, in FIG. 5, the conductive layer 5 includes a touch signal line. The conductive layer 5 directly contacts with the first alignment film 41, and the first alignment film 41 directly contacts with the liquid crystal after the display panel is formed, therefore, the conductive layer 5 is closer to the liquid crystal, and the touch driving signal on the conductive layer 5 has relatively great influence on the liquid crystal. In view of this, at least two types of touch driving signals with opposite polarities can be output to the conductive layer 5 at each touch stage, so that the liquid crystal will not be subjected to pulse voltage signals of a same polarity for a long time, thereby further reducing the possibility of polarization of the crystal and improving the poor display resulted therefrom.

Figure 6:
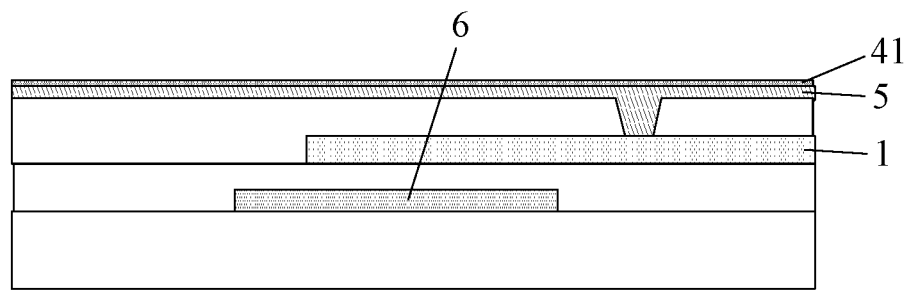
FIG. 6 illustrates another structural schematic diagram of a cross-section along AA' direction in FIG. 1.

Optionally, as shown in FIG. 1 and FIG. 5, the conductive layer 5 includes at least one touch signal line 2, and the at least one touch signal line 2 is located on a side surface of the first alignment film 41 away from the liquid crystal. As shown in FIG. 5, the pixel electrode 6 is located at a side of the conductive layer 5 away from the first alignment film 41, and the common electrode block 1 is located at a side of the pixel electrode 6 away from first alignment film 41. An insulation layer is provided between the conductive layer 5 and the common electrode block 1, a touch signal line (i.e., the conductive layer 5) is connected with a common electrode block 1 through a through-hole defined in the insulation layer, and another insulation layer is provided between the common electrode block 1 and the pixel electrode 6. It can be understood that, in another embodiment, as shown in FIG. 6, the common electrode block 1 is located at a side of the at least one touch signal line (i.e., the conductive layer 5) away from first alignment film 4, and the pixel electrode 6 is located at a side of the common electrode block 1 away from first alignment film 41. The at least one touch signal line is used for transmitting the touch driving signal to the common electrode block 1 at the touch stage, thus, if the touch signal line directly contacts with the first alignment film 41, the voltage signal on the touch signal line will have relatively strong influence on the liquid crystal, accordingly, it is necessary to output at least two types of touch driving signals with opposite polarities to the touch signal line at each touch stage, thereby reducing the possibility of polarization of the liquid crystal.

Figure 7:
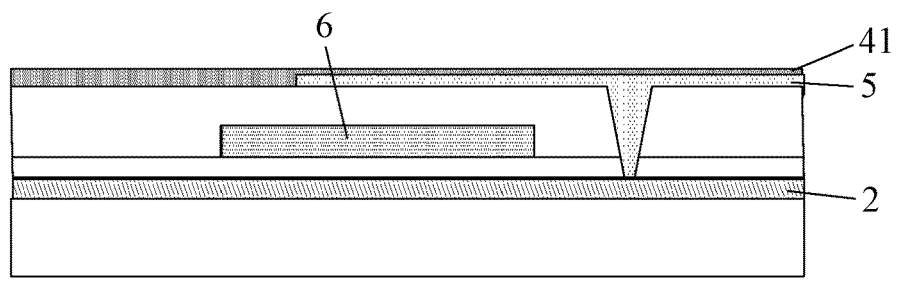
FIG. 7 illustrates another structural schematic diagram of a cross-section along AA' direction in FIG. 1.

Optionally, as shown in FIG. 1 and FIG. 7, the conductive layer 5 is the common electrode layer 10, and the common electrode layer 10 includes the above-mentioned common electrode block 1. That is, the common electrode block 1 (the conductive layer 5) is located on a side surface of the first alignment film 41 away from the liquid crystal, and the pixel electrode 6 and the touch signal line 2 are arranged at a side of the conductive layer 5 away from the first alignment film 41. Since the common electrode layer 10 directly contacts with the first alignment film 41, the voltage signal on the common electrode layer 10 has relatively strong influence on the liquid crystal. In addition, the common electrode block 1 of the common electrode layer 10 has a relatively great area. Therefore, such structure is more suitable for outputting at least two types of touch driving signals with opposite polarities to the common electrode block 1 at each touch stage, thereby further effectively reducing the possibility of polarization of the liquid crystal.

Figure 8:
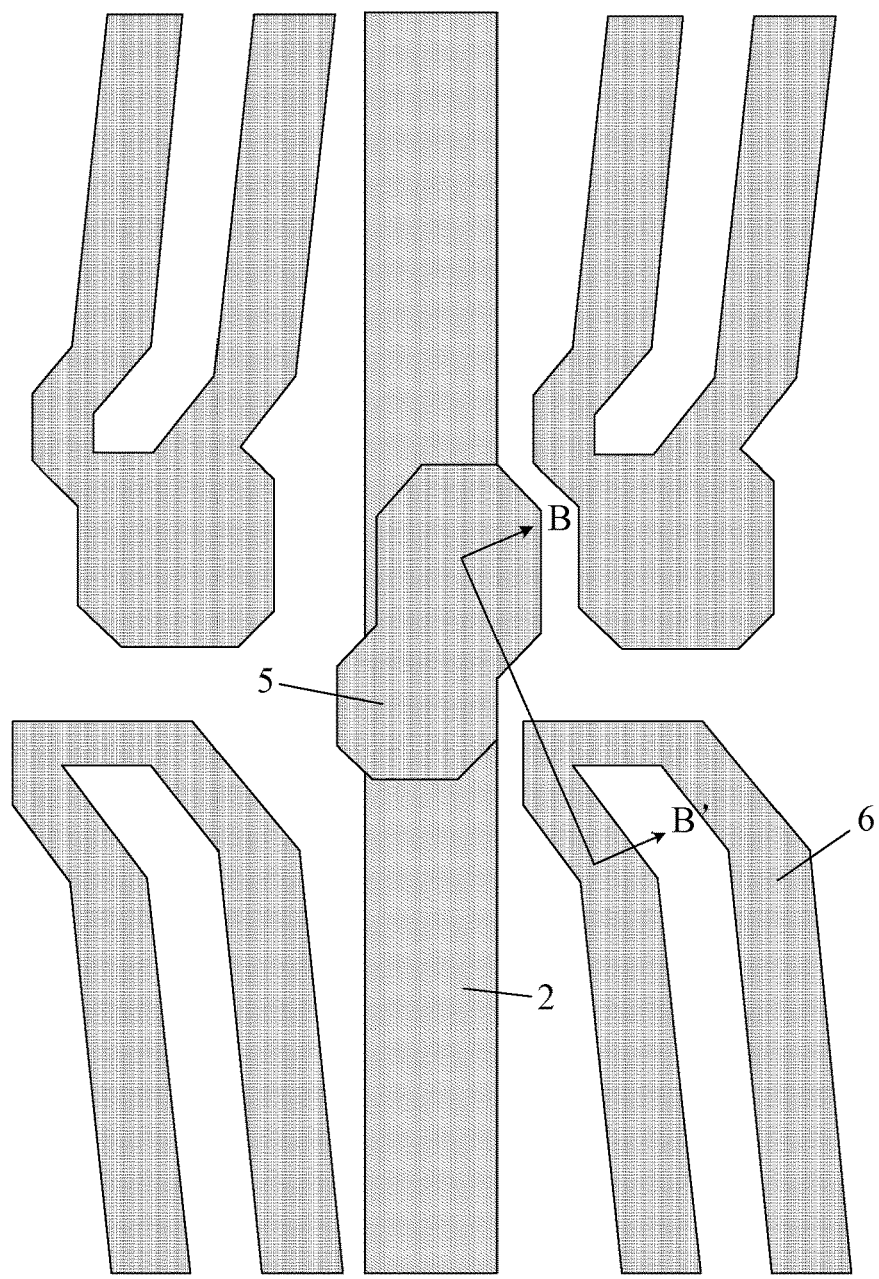
FIG. 8 illustrates a partial structural schematic diagram of another array substrate according to an embodiment of the present disclosure.
Figure 9:
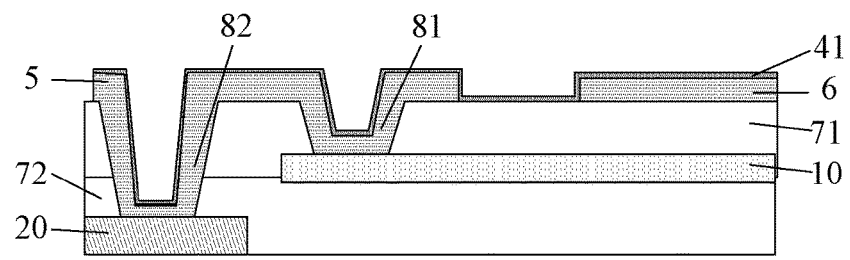
FIG. 9 illustrates a structural schematic diagram of a cross-section along BB' direction in FIG. 8.

Optionally, as shown in FIG. 8 and FIG. 9, the conductive layer 5 is located at a side of the common electrode layer 10 close to the first alignment film 41. The at least one touch signal line 2 is located in a touch signal line layer 20, and the touch signal line layer 20 is located at a side of the common electrode layer 10 away from first alignment film 41. A first insulation layer 71 is provided between the conductive layer 5 and the common electrode layer 10, and a second insulation layer 72 is provided between the common electrode layer 10 and touch signal line layer 20. The conductive layer 5 includes a bridge connection member, and the bridge connection member is located in a same layer where the pixel electrode 6 is located. The bridge connection member is electrically connected with the common electrode layer 10 through a first through-hole 81 defined in the first insulation layer 71, and the bridge connection member is electrically connected with the touch signal line 2 in the touch signal line layer 20 through a second through-hole 82 defined in the first insulation layer 71 and the second insulation layer 72. The touch signal line layer 20 may be located in a same layer where other metal layer(s) is located, so that the at least one touch signal line 2 together with other metal member(s) can be formed in one process. For example, the touch signal line layer 20 is located in a layer where the gate electrode metal layer is located, and the gate electrode metal layer includes a gate line in the array substrate and a gate electrode of a thin-film transistor; the source electrode of the thin-film transistor is connected with a date line, and the drain electrode of the thin-film transistor is connected with the pixel electrode, for controlling charging of the pixel electrode; the gate line is connected with the gate electrode of the thin-film transistor and a gate electrode driving circuit, for transmitting a gate electrode voltage signal to control turn-on and turn-off of the thin-film transistor. During working of the array substrate, the gate electrode driving circuit successively generates turn-on levels to be respectively output to the gate line in the rows; when the gate line transmits the turn-on level to the gate electrode of the thin-film transistor, the thin-film transistor is turned on and the corresponding data line transmits a data voltage to a corresponding pixel electrode, so as to charge the corresponding pixel electrode. The bridge connection member is used in a same layer where the pixel electrode 6 is located, to electrically connect the touch signal line with the common electrode layer 10 in the touch signal line layer 20. Since the bridge connection member directly contacts with the first alignment film 41, the voltage signal on the bridge connection member has relatively great influence on the liquid crystal. Accordingly, at least two types of touch driving signals with opposite polarities are output to bridge connection member at each touch stage, thereby reducing the possibility of polarization of the liquid crystal.

It should be noted that, FIG. 5, FIG. 6, FIG. 7 and FIG. 9 only illustrate four manners for arranging the membranous layer structure of the array substrate, however, the present disclosure do not limit the manner for arranging the membranous layer structure, as long as when the conductive layer 5 contacting with the first alignment film 41 is electrically connected with the common electrode, by applying the technical solution of the present disclosure, at least two types of touch driving signals with opposite polarities can be output to the conductive layer 5 at each touch stage, thereby reducing the possibility of polarization of the liquid crystal.

Figure 10:
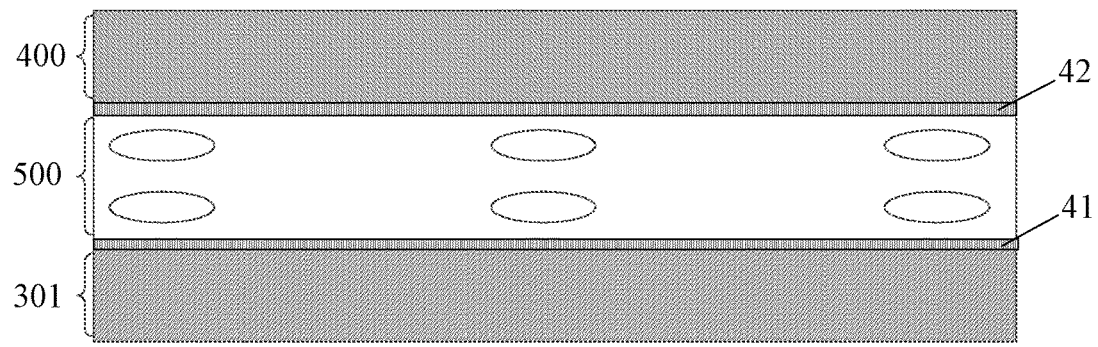
FIG. 10 illustrates a structural schematic diagram of a display panel according to an embodiment of the present disclosure.

As shown in FIG. 10, an embodiment of the present disclosure provides a display panel, including: the above-mentioned array substrate 301, the array substrate 301 not containing any alignment film; a first alignment film 41, a second alignment film 42, and a liquid crystal layer 500, the color film substrate 400, the array substrate 301 parallel to the color film substrate 400. The first alignment film 41, the liquid crystal layer 500 and the second alignment film 42 are successively arranged between the array substrate 301 and the color film substrate 400. When the display panel displays, an electric field will be generated between the pixel electrode of the array substrate 301 and the common electrode to control rotation of liquid crystal molecules in the liquid crystal layer 500, thereby achieving the display function. The first alignment film 41 and the second alignment film 42 are used to define the original orientation of the liquid crystal in the liquid crystal layer 500 without being subjected to the electric field.

The configuration and principle of the array substrate 301 can refer to the above embodiments, which are not repeated herein.

In the present embodiment, the display panel outputs at least two types of touch driving signals with opposite polarities to the common electrode block at each touch stage, which avoids the common electrode block from providing pulse signals of a same polarity for a long time, that is, the liquid crystal will not be subjected to pulse voltage signals of a same polarity for a long time, thereby reducing the possibility of the polarization of the liquid crystal and improving the poor display resulted therefrom.

Figure 11:
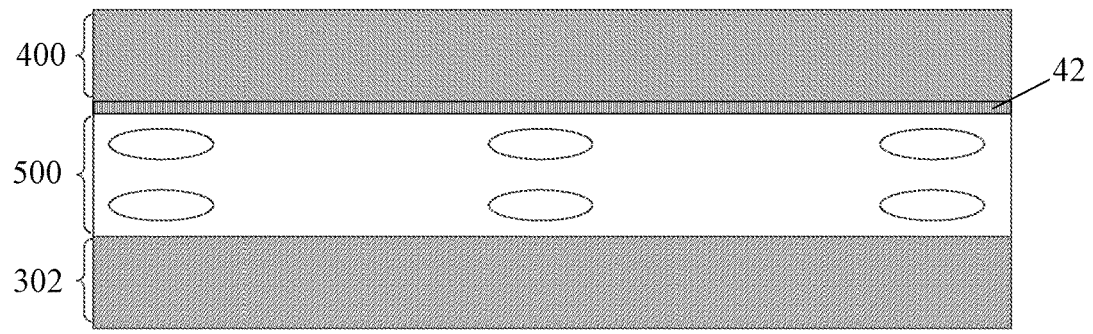
FIG. 11 illustrates a structural schematic diagram of another display panel according to an embodiment of the present disclosure.

As shown in FIG. 11, another embodiment of the present disclosure provides a display panel, including: the above-mentioned array substrate 302, the array substrate 302 containing the above-mentioned first alignment film; a second alignment film 42; a liquid crystal layer 500; and a color film substrate 400; the array substrate 302 parallel to the color film substrate 400. The liquid crystal layer and the second alignment film are successively arranged between the array substrate 302 and the color film substrate. When the display panel displays, an electric field is generated between the pixel electrode of the array substrate 301 and the common electrode to control rotation of liquid crystal molecules in the liquid crystal layer 500, thereby achieving the display function. The first alignment film and the second alignment film 42 are used to define the original orientation of the liquid crystal in liquid crystal layer 500 without being subjected to the electric filed. Compared with the display panel in FIG. 10, the first alignment film of the display panel in FIG. 11 belongs to the array substrate 302, while the array substrate 301 of the display panel in FIG. 10 does not contain any alignment film, and the first alignment film belongs to the display panel.

The configuration and principle of the array substrate 302 can refer to the above embodiments, which are not repeated herein.

In the display panel in the present embodiment, at least two types of touch driving signals with opposite polarities are output to common electrode block at each touch stage, which avoids the common electrode block from providing pulse signals of a same polarity for a long time, that is, the liquid crystal will not be subjected to pulse voltage signals of a same polarity for a long time, thereby reducing the possibility of the polarization of the liquid crystal and improving the poor display resulted therefrom.

Figure 12:
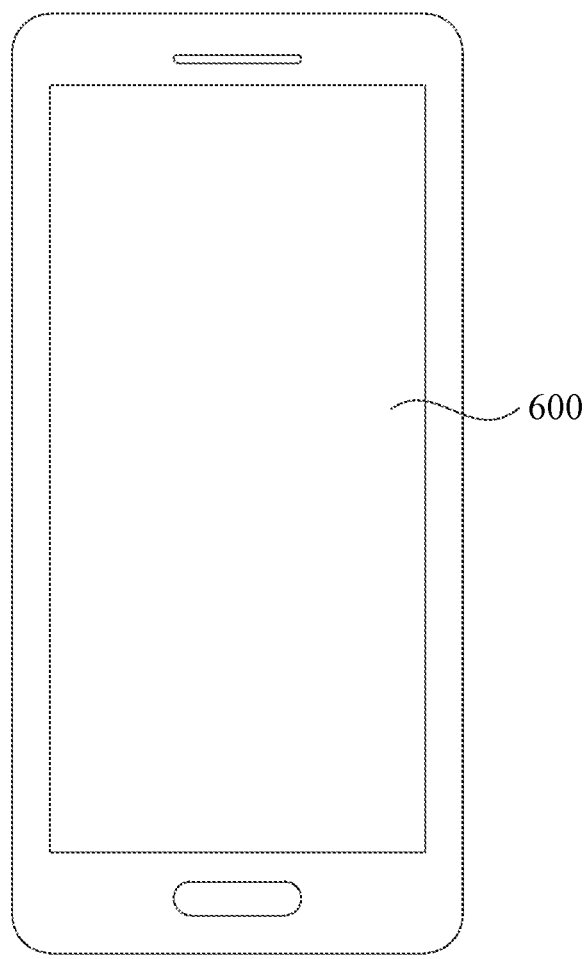
FIG. 12 illustrates a structural schematic diagram of a display device according to an embodiment of the present disclosure.

As shown in FIG. 12, an embodiment of the present disclosure provides a display device, including the display panel 600.

The configuration and principle of the display panel 600 can refer to the above embodiments, which are not repeated herein. The display device can be any electronic device with display function, for example, touch screen, cellphone, tablet PC, laptop computer, e-book, TV set, and the like.

In the display device provided by the present embodiment, at least two types of touch driving signals with opposite polarities are output to the common electrode block at each touch stage, which avoids the common electrode block from providing pulse signals of a same polarity for a long time, that is, the liquid crystal will not be subjected to pulse voltage signals of a same polarity for a long time, thereby reducing the possibility of the polarization of the liquid crystal and improving the poor display resulted therefrom.

An embodiment of the present disclosure provides a method for driving an array substrate, and the array substrate can be the above-mentioned array substrate. As shown in FIG. 1, FIG. 2, FIG. 3, FIG. 4, FIG. 13 and FIG. 14, the method includes steps of:

step 101, outputting, by a driving signal module 3, at least two types of touch driving signal with opposite polarities to at least one common electrode block 1 at each touch stage t1; and step 102, acquiring, by the driving signal module 3, at least one sensing signal on the at least one common electrode block 1, and determining a touch position according to the at least one sensing signal.

When there is no touch operation, the sensing signal on the common electrode block 1 is a touch driving signal output by the driving signal module 3; when there is touch operation, the finger of a user as the ground is coupled to the common electrode block 1 at the touch position, thereby generating a sensing signal, different from the touch driving signal, on the corresponding common electrode block 1, so as to further determine whether a touch occurs and determine the corresponding position of the touch according to the sensing signal on the common electrode block 1.

The procedure and principle of the method for driving the array substrate can refer to the above embodiments, which are not repeated herein.

By applying the method for driving the array substrate in the present embodiment, at least two types of touch driving signals with opposite polarities are output to common electrode block at each touch stage, which avoids the common electrode block from providing pulse signals of a same polarity for a long time, that is, the liquid crystal will not be subjected to pulse voltage signals of a same polarity for a long time, thereby reducing the possibility of the polarization of the liquid crystal and improving the poor display resulted therefrom.

Optionally, as shown in FIG. 2, FIG. 3, FIG. 4 and FIG. 13, the at least two types of touch driving signals with opposite polarities include a positive touch driving signal and a negative touch driving signal, wherein the number of the positive touch driving signal is N, the number of the negative touch driving signal is M, N is an integer greater than or equal to 1, and M is an integer greater than or equal to 1.

Optionally, as shown in FIG. 4, the at least two types of touch driving signals with opposite polarities include at least one group of touch driving signals; and each group of touch driving signals includes one touch driving signal S1 with positive polarity and one touch driving signal S2 with negative polarity.

Optionally, as shown in FIG. 2, the at least two types of touch driving signals with opposite polarities include at least one group of touch driving signals S; and each group of touch driving signals includes a touch driving signal with positive polarity and a touch driving signal with negative polarity, and the number of the touch driving signal with positive polarity is equal to the number of the touch driving signal with negative polarity.

Optionally, as shown in FIG. 4, the touch stage t1 includes a first touch stage t11 and a second touch stage t12; and the at least one common electrode block 1 includes a first common electrode block. The step of outputting, by the driving signal module, at least two types of touch driving signals with opposite polarities to each common electrode block at each touch stage t1 further includes steps of: outputting, by the driving signal module, at least two types of touch driving signals with opposite polarities to the first common electrode block at the first touch stage t11; and outputting, by the driving signal module, at least two types of touch driving signals with opposite polarities to the first common electrode block at the second touch stage t12; wherein a waveform of the at least two types of touch driving signals with opposite polarities output by the driving signal module at the first touch stage t11 is identical to or different from a waveform of the at least two types of touch driving signals with opposite polarities output by the driving signal module at the second touch stage t12.

Figures 13, 14:
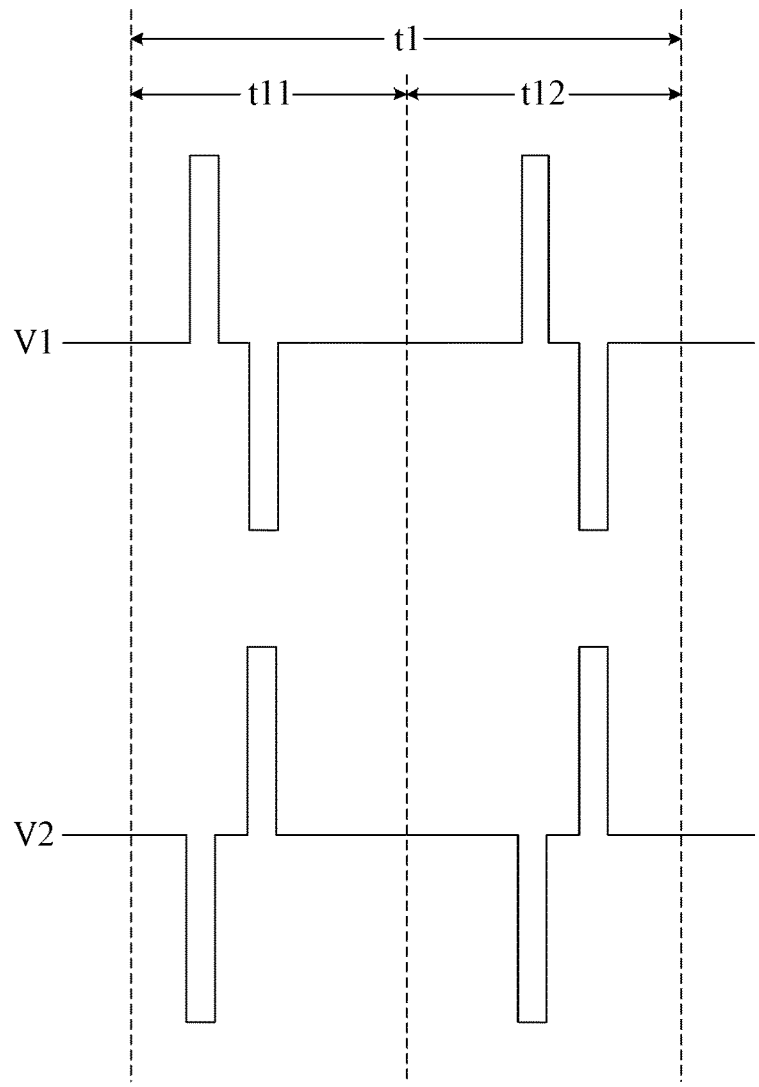
FIG. 13 illustrates a timing sequence diagram of signals output by a driving signal module to a first common electrode block and a second common electrode block according to an embodiment of the present disclosure.
FIG. 14 illustrates a flow chart of a method for driving an array substrate according to an embodiment of the present disclosure.

Optionally, as shown in FIG. 13, the touch stage t1 includes a first touch stage t11; and the at least one common electrode block includes a first common electrode block and a second common electrode block. The step of outputting, by a driving signal module, at least two types of touch driving signals with opposite polarities to at least one common electrode block at each touch stage t1 further includes: outputting, by the driving signal module, at least two types of touch driving signals with opposite polarities to the first common electrode block; and at the first touch stage t11 at the first touch stage t11; and outputting, by the driving signal module, at least two types of touch driving signals with opposite polarities to the second common electrode block at the first touch stage t11; wherein a waveform of the at least two types of touch driving signals with opposite polarities output by the driving signal module to the first common electrode block is identical to or different from a waveform of the at least two types of touch driving signals with opposite polarities output by the driving signal module to the second common electrode block. In FIG. 13, V1 represents a timing sequence of signals output by the driving signal module to the first common electrode block, and V2 represents a timing sequence of signals output by the driving signal module to the second common electrode block. FIG. 13 only illustrates a situation in the first touch stage t11 in which the waveform of the at least two types of touch driving signals with opposite polarities output by the driving signal module to the first common electrode block is different from the waveform of the at least two types of touch driving signals with opposite polarities output by the driving signal module to the second common electrode block.

It should be noted that, the above embodiments are merely used to illustrate the technical solutions of the present disclosure but not to constitute any limit thereon. Even though the present disclosure have been described by the embodiments in detail, those skilled in the art can still make further modifications to the technical solutions, or equivalent replacements to all or part of the technical features based on the above described embodiments without departing from the essence of the technical solutions of the present disclosure.

What is claimed is:
1. An array substrate, comprising:
a common electrode layer, the common electrode layer comprising at least one common electrode block;
at least one touch signal line;
a driving signal module;
a first alignment film; and
a conductive layer;
wherein each of the at least one touch signal line is connected with a corresponding common electrode block of the at least one common electrode block, each of the at least one touch signal line is connected with the driving signal module, and the driving signal module is configured to output at least two types of touch driving signals with opposite polarities to at least one of the at least one common electrode block at each touch stage,
the conductive layer contacts the first alignment film;
the driving signal module is configured to output at least two types of touch driving signals with opposite polarities to the conductive layer at each touch stage;
the conductive layer is placed at a side of the common electrode layer close to the first alignment film;

the at least one touch signal line is placed in a touch signal line layer, the touch signal line layer is placed at a side of the common electrode layer away from the first alignment film;

a first insulation layer is placed between the conductive layer and the common electrode layer, and a second insulation layer is placed between the common electrode layer and the touch signal line layer;

the conductive layer comprises a bridge connection member, and the bridge connection member and a pixel electrode are placed in a same layer; and the bridge connection member is electrically connected with the common electrode layer through a first through-hole defined in the first insulation layer, and the bridge connection member is electrically connected with the at least one touch signal line through a second through-hole defined in the first insulation layer and the second insulation layer.

2. The array substrate according to claim 1, wherein the driving signal module is configured to output at least two types of touch driving signals with opposite polarities to the at least one common electrode block at each touch stage.

3. The array substrate according to claim 1, wherein the common electrode layer comprises a plurality of common electrode blocks distributed in a matrix.

4. The array substrate according to claim 3, wherein each of the plurality of common electrode blocks is connected with at least one touch signal line.

5. The array substrate according to claim 1, wherein a waveform of the touch driving signals output by the driving signal module at one touch control stage is identical to a waveform of the touch driving signals output by the driving signal module at any other touch stage.

6. The array substrate according to claim 5, wherein the waveform comprise at least one group of touch driving signals; and each group of touch driving signals comprises one touch driving signal with positive polarity and one touch driving signal with negative polarity.

7. The array substrate according to claim 5, wherein the waveform comprises at least one group of touch driving signals;

each group of touch driving signals comprises a touch driving signal with positive polarity and a touch driving signal with negative polarity, and a number of the touch driving signal with positive polarity is equal to a number of the touch driving signal with negative polarity.

8. The array substrate according to claim 1, wherein the conductive layer comprises at least one touch signal line.

9. A display panel, comprising:
an array substrate, the array substrate comprising a common electrode layer, at least one touch signal line, a driving signal module, a first alignment film and a conductive layer, the common electrode layer comprising at least one common electrode block,
a conductive layer,
a second alignment film,
a liquid crystal layer, and
a color film substrate;
wherein each of the at least one touch signal line is connected with a corresponding common electrode block of the at least one common electrode block, each of the at least one touch signal line is connected with the driving signal module, and the driving signal module is configured to output at least two types of touch driving signals with opposite polarities to at least one of the at least one common electrode block at each touch stage;
wherein the conductive layer contacts the first alignment film, and the driving signal module is configured to output at least two types of touch driving signals with opposite polarities to the conductive layer at each touch stage; and
wherein the array substrate is parallel to the color film substrate; and the liquid crystal layer and the second alignment film are successively arranged between the array substrate and the color film substrate,
the conductive layer is placed at a side of the common electrode layer close to the first alignment film;
the at least one touch signal line is placed in a touch signal line layer, the touch signal line layer is placed at a side of the common electrode layer away from the first alignment film;
a first insulation layer is placed between the conductive layer and the common electrode layer, and a second insulation layer is placed between the common electrode layer and the touch signal line layer;
the conductive layer comprises a bridge connection member, and the bridge connection member and a pixel electrode are placed in a same layer;
the bridge connection member is electrically connected with the common electrode layer through a first through-hole defined in the first insulation layer, and the bridge connection member is electrically connected with the at least one touch signal line through a second through-hole defined in the first insulation layer and the second insulation layer.

10. A method for driving an array substrate, the array substrate comprising:
a common electrode layer, the common electrode layer comprising at least one common electrode block;
at least one touch signal line;
a driving signal module;
a first alignment film; and
a conductive layer;
wherein each of the at least one touch signal line is connected with a corresponding common electrode block of the at least one common electrode block, each of the at least one touch signal line is connected with the driving signal module, and the driving signal module is configured to output at least two types of touch driving signals with opposite polarities to at least one of the at least one common electrode block at each touch stage,
the conductive layer contacts the first alignment film;
the driving signal module is configured to output at least two types of touch driving signals with opposite polarities to the conductive layer at each touch stage;
the conductive layer is placed at a side of the common electrode layer close to the first alignment film;
the at least one touch signal line is placed in a touch signal line layer, the touch signal line layer is placed at a side of the common electrode layer away from the first alignment film;
a first insulation layer is placed between the conductive layer and the common electrode layer, and a second insulation layer is placed between the common electrode layer and the touch signal line layer;
the conductive layer comprises a bridge connection member, and the bridge connection member and a pixel electrode are placed in a same layer; and the bridge connection member is electrically connected with the common electrode layer through a first through-hole defined in the first insulation layer, and the bridge connection member is electrically connected with the at least one touch signal line through a second through-hole defined in the first insulation layer and the second insulation layer, wherein the method comprises a step of:

outputting, by the driving signal module, at least two types of touch driving signals with opposite polarities to at least one common electrode block at each touch stage.

11. The method according to claim 10, wherein the touch driving signals with opposite polarities comprise a touch driving signal with positive polarity and a touch driving signal with negative polarity, wherein a number of the touch driving signal with positive polarity is N, a number of the touch driving signal with negative polarity is M, N is an integer greater than or equal to 1, and M is an integer greater than or equal to 1.

12. The method according to claim 11, wherein the touch driving signals with opposite polarities comprise at least one group of touch driving signals; and each group of touch driving signals comprises one touch driving signal with positive polarity and one touch driving signal with negative polarity.

13. The method according to claim 11, wherein the touch driving signals with opposite polarities comprise at least one group of touch driving signals; and each group of touch driving signals comprises at least one touch driving signal with positive polarity and at least one touch driving signal with negative polarity, and a number of the at least one touch driving signal with positive polarity is equal to a number of the at least one touch driving signal with negative polarity.

14. The method according to claim 10, wherein the touch stage comprises a first touch stage and a second touch stage; and the at least one common electrode block comprises a first common electrode block;

the step of outputting, by the driving signal module, at least two types of touch driving signals with opposite polarities to at least one common electrode block at each touch stage, comprises steps of:

outputting, by the driving signal module, at least two types of touch driving signals with opposite polarities to the first common electrode block at the first touch stage; and outputting, by the driving signal module, at least two types of touch driving signals with opposite polarities to the first common electrode block at the second touch stage;

wherein a waveform of the touch driving signals output by the driving signal module at the first touch stage is identical to or different from a waveform of the touch driving signals output by the driving signal module at the second touch stage.

15. The method according to claim 10, wherein the touch stage comprises a first touch stage; and the at least one common electrode block comprises a first common electrode block and a second common electrode block;

wherein the step of outputting, by the driving signal module, at least two types of touch driving signals with opposite polarities to at least one common electrode block at each touch stage, comprises steps of:

outputting, by the driving signal module, a plurality of touch driving signals with opposite polarities to the first common electrode block at the first touch stage; and outputting, by the driving signal module, a plurality of touch driving signals with opposite polarities to the second common electrode block at the first touch stage;

wherein a waveform of the touch driving signals output by the driving signal module to the first common electrode block is identical to or different from a waveform of the touch driving signals output by the driving signal module to the second common electrode block.

* * * * *